United States Patent [19]

Wasilewski

[11] Patent Number: 5,418,782
[45] Date of Patent: May 23, 1995

[54] METHODS AND APPARATUS FOR PROVIDING VIRTUAL SERVICE SELECTION IN A MULTI-SERVICE COMMUNICATIONS SYSTEM

[75] Inventor: Anthony J. Wasilewski, Alpharetta, Ga.

[73] Assignee: Scientific-Atlanta, Inc., Atlanta, Ga.

[21] Appl. No.: 178,041

[22] Filed: Jan. 6, 1994

Related U.S. Application Data

[63] Continuation-in-part of Ser. No. 27,782, Mar. 8, 1993, Pat. No. 5,359,601, and a continuation-in-part of Ser. No. 968,846, Oct. 30, 1992, Pat. No. 5,400,401.

[51] Int. Cl.$^6$ .............................................. H04H 1/06
[52] U.S. Cl. ........................................ 370/73; 380/19; 348/906; 455/3.1
[58] Field of Search .................. 370/110.1, 73, 71, 80, 370/79, 13, 17, 66, 60:94.1, 76, 69.1; 395/425, 325; 380/10, 20, 14, 21, 34, 9, 19, 33, 13; 348/3, 6, 13, 481, 473, 10, 11, 462, 465, 906; 358/426, 471; 379/96, 97, 98, 101, 399; 455/3.1, 3.2, 4.2, 2, 6.1, 6.2, 6.3

[56] References Cited

U.S. PATENT DOCUMENTS

| | | | |
|---|---|---|---|
| 4,009,345 | 2/1977 | Flemming | 370/80 |
| 4,009,346 | 2/1977 | Parker | 370/80 |
| 4,218,756 | 8/1980 | Fraser | 395/425 |
| 4,484,217 | 11/1984 | Block | 348/3 |
| 4,742,543 | 5/1988 | Frederiksen | 380/9 |
| 4,787,085 | 11/1988 | Suto | 370/110.1 |
| 4,829,569 | 5/1989 | Seth-Smith | 380/10 |
| 4,866,770 | 9/1989 | Seth-Smith | 380/20 |
| 4,907,220 | 3/1990 | Rau et al. | 370/94.1 |
| 4,908,859 | 3/1990 | Bennett | 380/10 |
| 5,003,384 | 3/1991 | Durden | 348/3 |
| 5,091,936 | 2/1992 | Katznelson | 380/19 |
| 5,119,369 | 6/1992 | Tanabe | 370/60 |
| 5,200,823 | 4/1993 | Yoneda | 348/473 |
| 5,212,691 | 5/1993 | Hokari | 370/110.1 |
| 5,280,470 | 1/1994 | Buhrke | 370/13 |
| 5,296,931 | 3/1994 | Na | 348/731 |
| 5,303,233 | 4/1994 | Sugawara | 370/60 |
| 5,311,506 | 5/1994 | Beisel | 370/66 |
| 5,313,455 | 5/1994 | van der Wal | 370/13 |

FOREIGN PATENT DOCUMENTS

4207766A1 9/1992 Germany.
2218287A 11/1989 United Kingdom.

OTHER PUBLICATIONS

International Search Report PCT/US94/02377, dated Jun. 30, 1994.
Beddow, David P., "The Virtual Channels Subscriber Interface", Communications Technology, pp. 30 & 49, (Apr. 1992).
Four (4) viewgraphs, presented in confidence Mar. 9-10, 1992.

Primary Examiner—Douglas W. Olms
Assistant Examiner—Dang Ton
Attorney, Agent, or Firm—Woodcock, Washburn, Kurtz, Mackiewicz & Norris

[57] ABSTRACT

Methods and apparatus are disclosed for providing virtual service selection in a multi-service communications system wherein the service components of each of a number of basic services are transmitted to subscriber locations on one of a plurality different frequency channels. Each frequency channel may carry the service components of more than one basic service. A virtual service definition is generated for each basic service that specifies which of the service components carried on a particular frequency channel comprise that service. The virtual service definition for each basic service is periodically, and frequently, transmitted to each subscriber location on the frequency channel carrying the service components that comprise that basic service. When a subscriber selects a given basic service for output at the subscriber location, a decoder at the subscriber location tunes to the frequency channel carrying the service components of the selected basic service, extracts a virtual service definition for the selected basic service from the tuned frequency channel, and then obtains from the frequency channel the service components specified in the extracted virtual service definition as comprising the selected basic service.

16 Claims, 7 Drawing Sheets

| VIRTUAL SERVICE NUMBER | FREQUENCY |
|---|---|
| 1 | $f_1$ |
| 2 | $f_1$ |
| 3 | $f_3$ |
| 4 | $f_2$ |
| ⋮ | ⋮ |
| 24 | $f_2$ |
| ⋮ | ⋮ |
| 30 | $f_3$ |
| 31 | $f_8$ |
| 32 | $f_8$ |
| ⋮ | ⋮ |

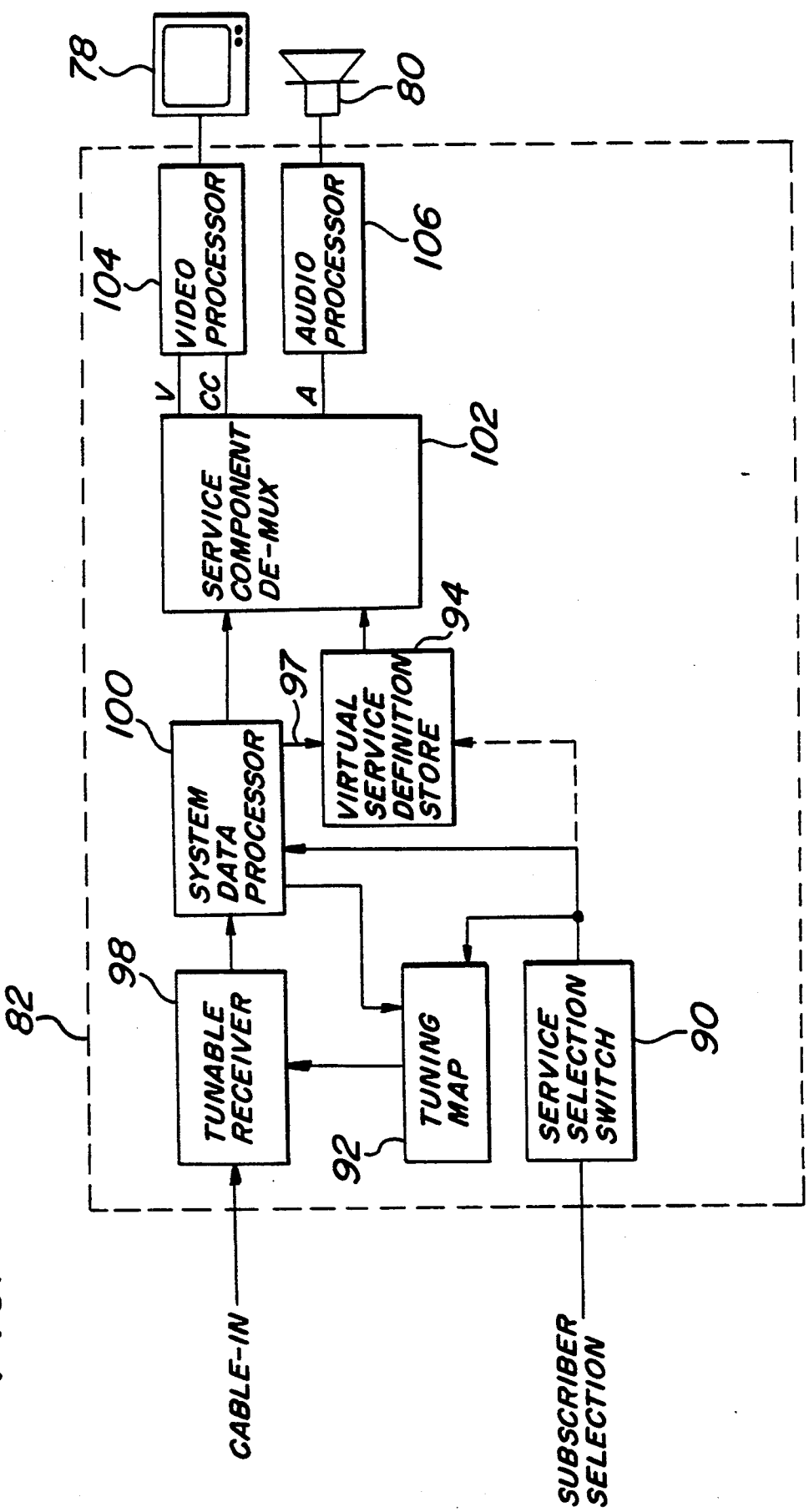

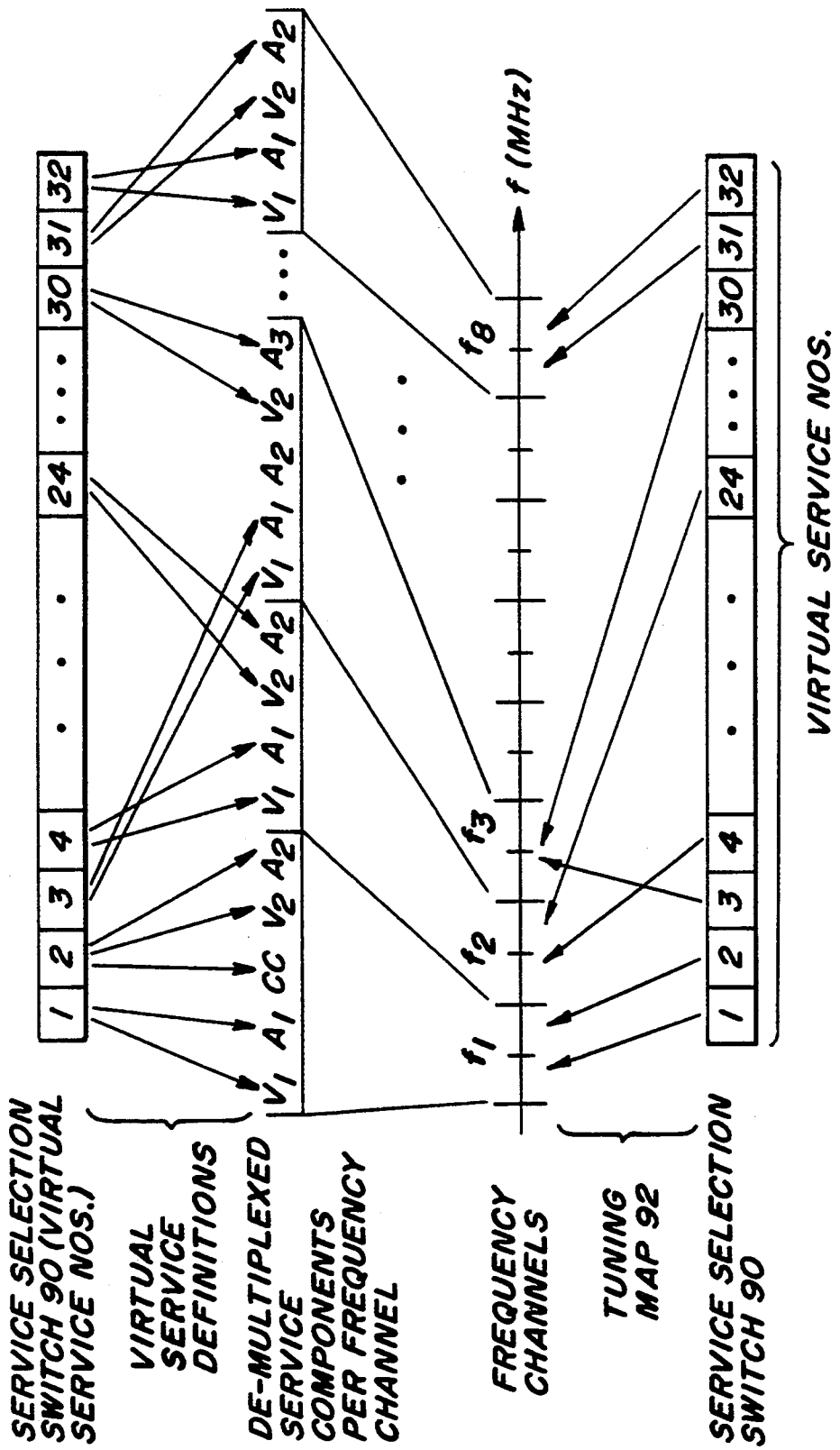

METHODS AND APPARATUS FOR PROVIDING VIRTUAL SERVICE SELECTION IN A MULTI-SERVICE COMMUNICATIONS SYSTEM

CROSS REFERENCE TO RELATED APPLICATIONS

This is a continuation-in-part of U.S. patent application Ser. No. 08/027,782, filed Mar. 8, 1993, now U.S. Pat. No. 5,359,601 entitled "Apparatus Providing Dynamic Virtual Service Selection in a Multi-Service Communications System" and of U.S. patent application Ser. No. 07/968,846, filed Oct. 30, 1992, now U.S. Pat. No. 5,400,401 entitled "System and Method for Transmitting a Plurality of Digital Services", both of which are hereby incorporated by reference.

BACKGROUND OF THE INVENTION

1. Field of the Invention

The present invention generally relates to multiservice communications systems wherein a plurality of different services are transmitted to subscriber locations over one or more different frequency channels. More particularly, the present invention relates to methods and apparatus for providing virtual service selection in such multi-service communications systems.

2. Description of the Prior Art

Communications systems today have the ability to simultaneously transmit a multitude of video, audio, teletext and data services to subscribers. For example, with the advent of digital compression technologies, the subscription television industry has experienced an explosion in the number of services that can be provided to each subscriber. Consequently, subscribers face an overwhelming choice of available services, and providing efficient and inventive ways for subscribers to access these services is extremely important.

Most multi-service communications systems transmit different services over one or more different frequency channels. Each frequency channel may carry more than one service. Accessing a particular service requires tuning to the frequency channel carrying that service, and then selecting that service from the many services carried on that frequency channel. Generally, it is desirable to insulate subscribers from the details of service access and to allow subscribers to access different services in a like manner. Subscription television operators typically assign each service a unique number and then provide subscribers with a decoder that allows the subscriber to access a particular service by selecting that service's number using a push-button device or handheld remote. Subscribers are thereby insulated from the complex details of service acquisition.

Additionally, it is desirable to provide system operators with the ability to easily re-assign service numbers to different services. Some services may be discontinued and others may be added, and therefore, a static numbering system rapidly becomes obsolete. Bennett et al., U.S. Pat. No. 4,908,859, and Yoneda et al., U.S. Pat. No. 5,200,823, both describe multi-service communications systems that provide system operators with a degree of flexibility in channel number assignment. Both systems employ a scheme sometimes referred to as "virtual channel mapping" in which a "channel map" is employed to map each available service to a different subscriber selectable channel number. In both systems, the channel map is stored in the user's decoder and contains an entry for each user selectable channel number. When a user selects a given service number for viewing, the decoder accesses the channel map entry for that channel number to determine which of the services being received by the decoder corresponds to the selected channel number. When the appropriate service is identified, the decoder tunes to the appropriate frequency and retrieves the selected service from the incoming data on that frequency channel. A system operator can alter the channel number assignments by modifying the appropriate channel map entries. Both systems allow a system operator to transmit new channel map entries to the decoder over one or more of the frequency channels. However, in each system, the entire channel map is stored in a memory in the decoder at all times. Unfortunately, with the ever increasing number of available services, the amount of memory required to store an entire channel map can become prohibitive. Consequently, there is a need for a method and apparatus that provides virtual service selection in a multi-service communications system without the need to store the entire channel map in the decoder. The present invention satisfies this need.

SUMMARY OF THE INVENTION

One aspect of the present invention is directed to a method for enabling a subscriber to access different basic services in a multi-service communications system wherein each of the different basic services comprises a plurality of service components and the service components of each basic service are received at the subscriber location in a multiplexed form on one of a plurality of frequency channels. Some frequency channels may contain multiplexed service components for more than one basic service. As described herein, the method comprises the steps of (a) generating a virtual service definition for each basic service that specifies which of the service components carried on a particular frequency channel comprise that service; and (b) periodically transmitting the virtual service definition for each basic service to the subscriber location on the frequency channel carrying the service components that comprise that basic service. A decoder at the subscriber location may tune to the frequency channel carrying the service components of a selected basic service, extract from the tuned frequency channel one of the virtual service definitions transmitted thereon for the selected basic service, and then obtain from the frequency channel the service components specified in the extracted virtual service definition. Preferably, a unique virtual service number is assigned to each basic service, and the virtual service definition for each basic service comprises a virtual service number designation and at least one service component assignment.

At a subscriber location, a method for accessing the service components of a selected basic service comprises the steps of (a) tuning to the frequency channel carrying the service components of the selected basic service; (b) extracting from the tuned frequency channel one of the virtual service definitions transmitted thereon for the selected basic service; and (c) obtaining from the tuned frequency channel the service components specified in the extracted virtual channel definition as comprising the selected basic service. Preferably, a tuning map is provided at the subscriber location that specifies, for each basic service, which of the frequency channels carries the multiplexed service components that comprise that basic service. When such a tuning map is provided, the step of tuning to the frequency channel carrying the service components of the selected basic service comprises (i) accessing the tuning map to determine which of the frequency channels carries the multiplexed service components of the selected basic service; and (ii) tuning to the frequency channel specified in the tuning map for that basic service.

Another aspect of the present invention is directed to an apparatus for providing virtual service selection at a subscriber location in a multi-service communications system. According to the present invention, the apparatus comprises means for generating a virtual service definition for each basic service that specifies which service components carried on a particular frequency channel comprise that basic service; and means for periodically transmitting to the subscriber location the virtual service definition for each basic service. Preferably, the virtual service definitions for a given basic service are transmitted to the subscriber location only on the frequency channel carrying the service components that comprise that basic service.

A decoder apparatus for use in such a system comprises a service selection switch for selecting one of the basic services for output at the subscriber location; means for tuning to the frequency channel carrying the multiplexed service components of the selected basic service and for receiving the multiplexed service components carried on that frequency channel; means for extracting from the tuned frequency channel one of the virtual service definitions transmitted thereon for the selected basic service; and a de-multiplexer coupled to the receiving means and responsive to the extracted virtual service definition for de-multiplexing the received multiplexed service components and for obtaining the service components specified in the extracted virtual service definition as comprising the selected basic service. Preferably, the means for tuning and receiving comprises a tuning map that specifies, for each basic service, which of the frequency channels carries the multiplexed service components that comprise that basic service; and a tunable receiver responsive to the tuning map for tuning to a frequency channel specified by the tuning map.

As described hereinafter, the present invention may be embodied in a multi-service communications system that operates in accordance with the MPEG-2 Systems standard, wherein each basic service defines a "program", and each virtual service definition defines a "program definition" in accordance with the standard. Additional features and details of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings embodiments that are presently preferred, it being understood, however, that the invention is not limited to the specific methods and instrumentalities disclosed. In the drawings:

FIG. 6 is a block diagram of one embodiment of an apparatus for providing virtual service selection in a multi-service communications system in accordance with the present invention;

FIG. 9 graphically illustrates the mapping functions of the apparatus of FIG. 6.

DETAILED DESCRIPTION OF THE PREFERRED EMBODIMENT

Before proceeding to the description of the drawings, it should be understood that, although the present invention is described herein as embodied in a CATV or subscription television system, the present invention is in no way limited thereto. Rather, the present invention may be employed in any multi-service communications system in which virtual service selection is required.

Figure 1:
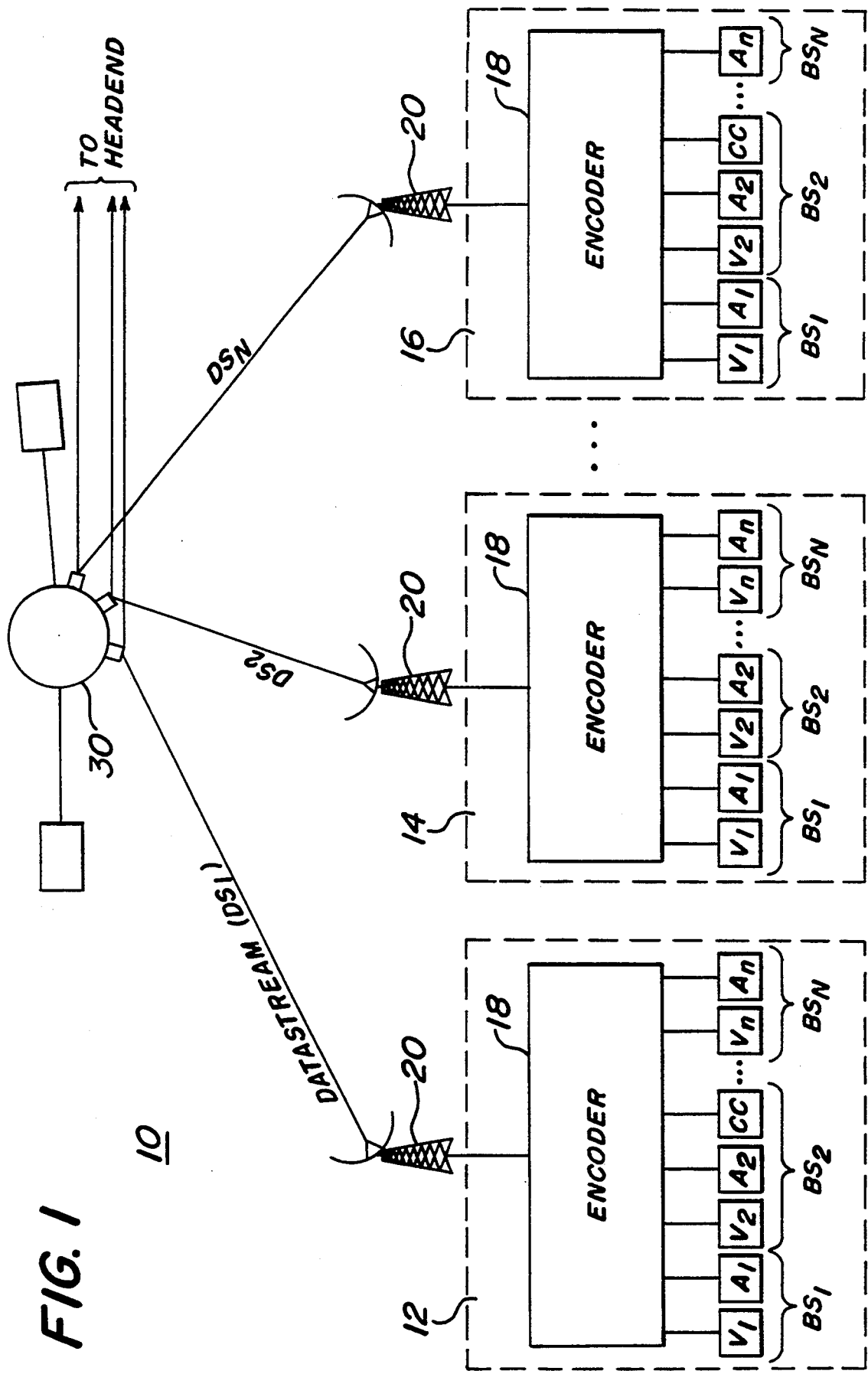
FIG. 1 is a block diagram of an exemplary subscription television system in which the method and apparatus of the present invention may be embodied.

Referring now to the drawings wherein like numerals indicate like elements throughout, FIG. 1 shows a partial block diagram of an exemplary subscription television system 10 in which the methods and apparatus of the present invention may be embodied. As used herein, the term "subscriber" means any person or location that receives basic services transmitted in the system. In the context of the subscription television system of FIG. 1, the term "subscriber" typically applies to each individual who subscribes to the subscription television service being provided. As shown in FIG. 1, the system 10 comprises a plurality of encoders 18 each of which is operated by a "programmer", e.g. 12, 14 and 16. Any number of programmers may be present in the system 10. Programmers are entities that provide one or more basic services (e.g., $BS_1 \ldots BS_N$) for transmission to various subscribers. For example, in FIG. 1, programmer 12 is providing basic services $BS_1, BS_2 \ldots BS_N$. The number of basic service provided by a given programmer is limited only by available bandwidth. In subscription television systems, basic services are most often television programs, however, any type of service can be transmitted. For example, a basic service can be a digital audio service or a teletext service.

Each basic service comprises a set of related service components, such as video (V), audio (A) and closed-captioning (CC) service components, as shown. In the present embodiment, the service components comprise digital data, however, the present invention is not limited thereto and may also be employed in systems that transmit analog service components or a combination of digital and analog service components. Moreover, one or more service components of a given basic service may be compressed and/or encrypted prior to transmission.

At each programmer site 12, 14, 16, the service components (i.e., V, A, CC) of the basic services (BS$_1$, BS$_2$ ... BS$_N$) to be transmitted from that site are provided to an encoder 18 at that site. The encoder 18 multiplexes the service components of each basic service to generate a multiplexed data stream containing the multiplexed service components and, as explained hereinafter, various other system related data, some of which may be necessary for operation of the methods and apparatus of the present invention. Each programmer 12, 14, 16 then provides its multiplexed data stream (e.g. DS$_1$, DS$_2$ ... DS$_N$) to a respective satellite up-link 20 for transmission via satellite 30 to a remote location, such as a head-end installation or a direct-broadcast-satellite (DBS) subscriber. Typically, each programmer transmits its respective data stream over a different satellite transponder. Each transponder operates at a different transponder frequency.

Figure 2:
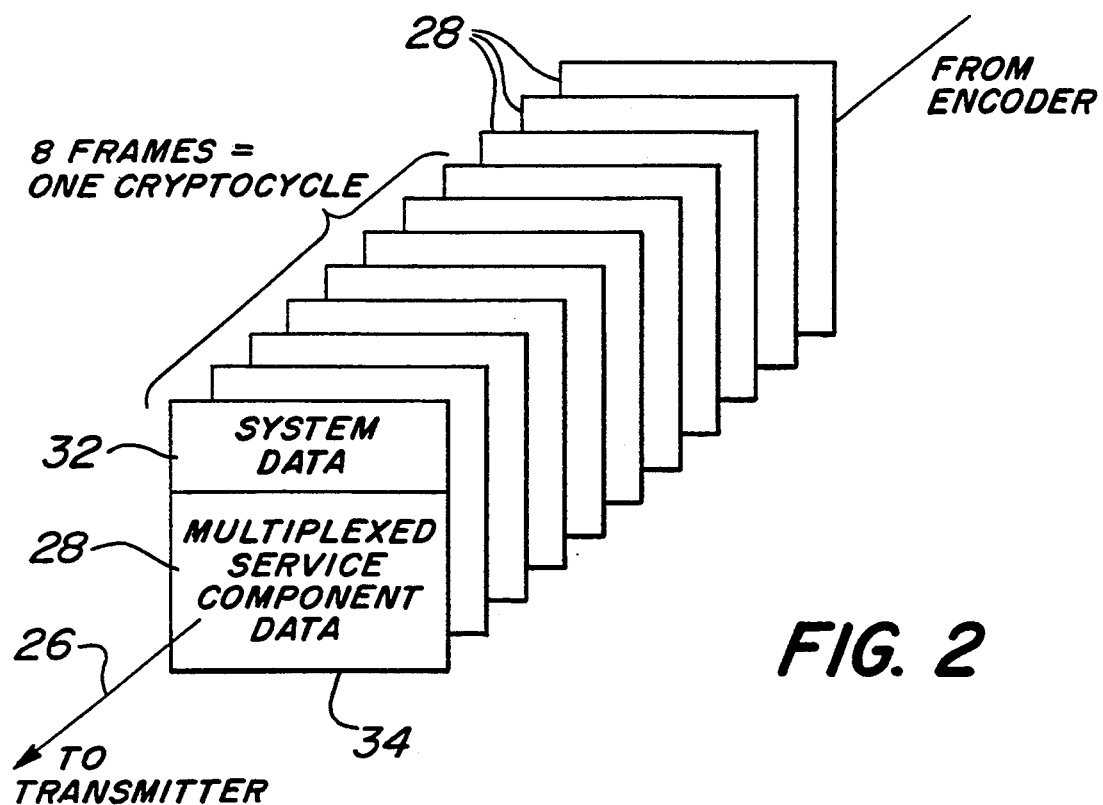
FIG. 2 graphically illustrates the content and arrangement of an exemplary digital data stream comprising system data and a plurality of multiplexed service components.

Each encoder 18 in the exemplary subscription television system 10 of FIG. 1 may generate its respective multiplexed data stream in accordance with the exemplary frame-based multiplexing format illustrated in FIG. 2. It is understood, however, that any multiplexing format may be employed by the encoders 18. For example, as explained hereinafter, each encoder 18 may alternatively operate in accordance with the MPEG-2 Systems standard specified in the MPEG-2 Systems Committee Draft (ISO/IEC JTC1/SC29/WG11/N0601, November, 1993) [hereinafter "MPEG-2 Systems Committee Draft"], which is hereby incorporated by reference.

As shown in FIG. 2, the exemplary frame-based multiplex format comprises a continuous sequence of frames 28. A system data region 32 of each frame may contain system related information necessary for operation of the system 10. A service component data region 34 of each frame carries the multiplexed service components of the various basic services input to the encoder 18. As described hereinafter in greater detail, the system data may include information employed in accordance with the method and apparatus of the present invention. Because certain types of system data may be too numerous to transmit in a single frame, these types of data may be spread over a series of frames referred to herein as a "cryptocycle." According to the example shown in FIG. 2, a cryptocycle comprises eight (8) frames; however, a cryptocycle can be defined by any number of frames. Essentially, cryptocycles define fixed boundaries in the data stream 26 within which a complete set of system data is transmitted.

Figure 3:
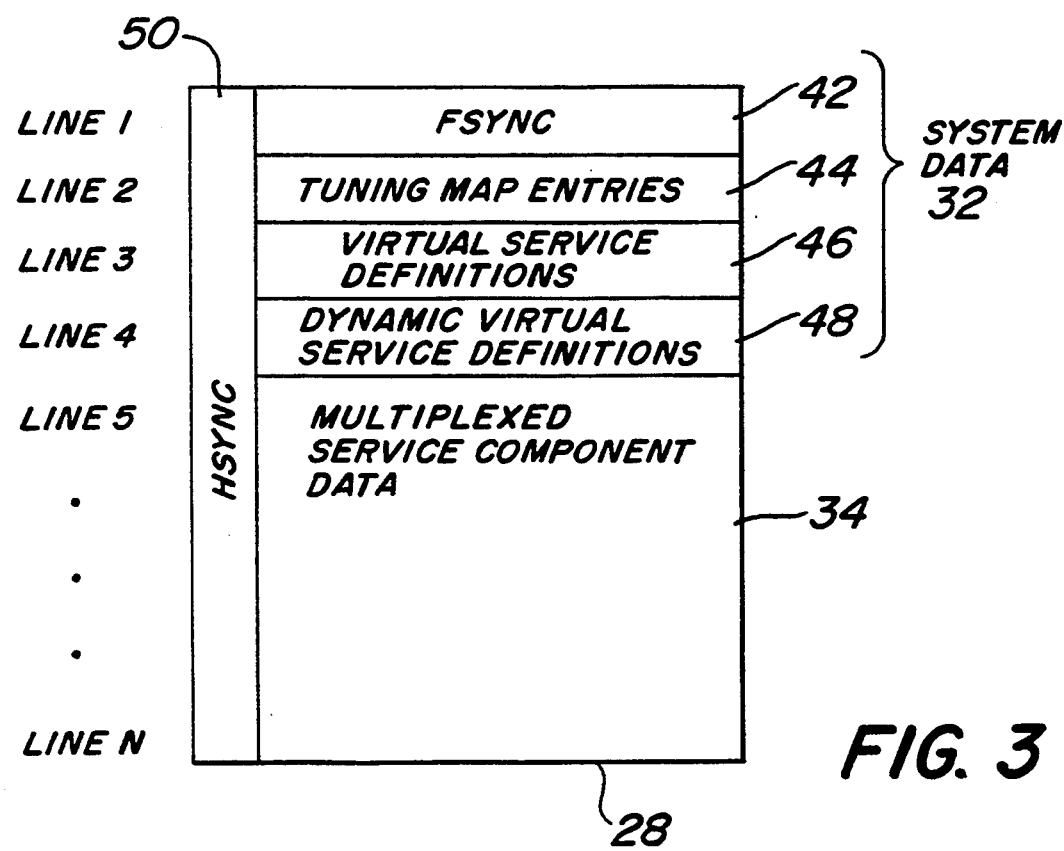
FIG. 3 illustrates further details of the content and arrangement of the exemplary data stream of FIG. 2.

FIG. 3 illustrates in greater detail the general arrangement and structure of a single frame 28 of the exemplary data stream format of FIG. 2. As shown, each frame begins with a frame sync word (FSYNC) 42, and each line of the frame may begin with a horizontal sync word (HSYNC) 50. Each line may comprise a fixed number of bits, such as 1600 bits. Decoders in the system may employ the HSYNC and FSYNC words to establish frame synchronization after receiving the data stream. For purposes described hereinafter, and in accordance with the present invention, the system data region 32 of each frame 28 may carry tuning map entries 44 and service-to-component map definitions 46. As explained in parent application Ser. No. 08/027,782, the system data region of each frame may also carry dynamic virtual service map definitions in accordance with a dynamic virtual service selection feature described therein which provides system operators with the ability to define new services (i.e., dynamic virtual services) using time-varying groups of basic services. Other system related information may also be carried. As explained above, the multiplexed service components of each basic service are carried in region 34 of each frame 28. Preferably, the service components of the various basic service are multiplexed by allocating different portions of region 34 of each successive frame to different ones of the service components. An exemplary method of multiplexing the individual service components and an exemplary implementation of each encoder 18 are described in parent application Ser. No. 07/968,846. As mentioned above, however, the particular implementation of each encoder 18 and the particular arrangement and format of the multiplexed data stream generated by each encoder are not crucial to the present invention. Rather the present invention is applicable to any communications system wherein individual service components are multiplexed and transmitted to a remote location. For example, as explained in greater detail below, the methods and apparatus of the present invention may be embodied in a system that multiplexes and transmits service components in accordance with the MPEG-2 Systems standard (ISO 13818) set forth in the aforementioned MPEG-2 Systems Committee Draft.

Figure 4:
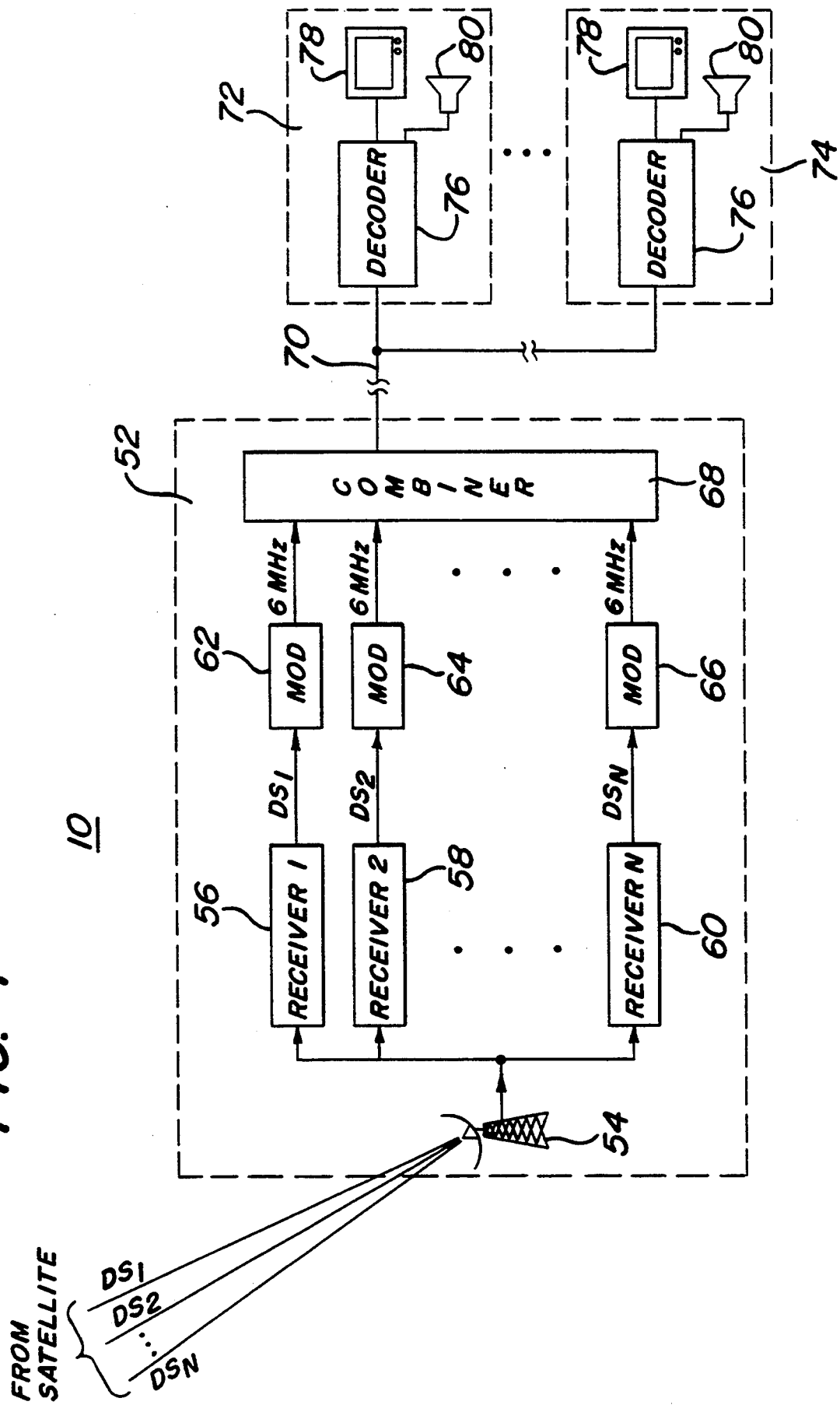
FIG. 4 is a block diagram providing further details of the exemplary subscription television system of FIG. 1.

FIG. 4 illustrates further details of the exemplary subscription television system 10 of FIG. 1. In particular, FIG. 4 shows a block diagram of a cable head-end installation 52 and a plurality of subscriber locations, e.g. 72, 74. As shown, the multiplexed data streams (i.e., DS$_1$, DS$_2$ ... DS$_N$), which each contain the service components of a number of basic service, are acquired at the head-end 52 via satellite down-link 54 and provided to respective receivers 56, 58, 60. Each receiver 56, 58, 60 is tuned to a respective satellite transponder frequency for receiving the data stream carried over that transponder. After receipt at the head-end 52, each data stream is then provided to a respective modulator 62, 64 or 66 where it is modulated on a unique frequency channel. Each frequency channel typically has a bandwidth of 6 MHz, however, the bandwidth of each frequency channel may vary with different applications. Modulators 62, 64 and 66 preferably employ 64-QAM (quadrature amplitude modulation). Alternatively, modulators 62, 64 and 66 may employ 4-VSB (vestigial side-band) modulation or any other suitable modulation technique. As shown, the individual frequency channels are then provided to a combiner 68 that combines the frequency channels into a single wide-band signal that is then transmitted via a cable distribution network 70 to each of the subscriber locations 72, 74. As can be appreciated, therefore, the service components of each basic service are provided to each subscriber location, in multiplexed form, on one of the plurality of frequency channels. As explained above, each multiplexed data stream DS$_1$, DS$_2$ ... DS$_N$, and therefore each frequency channel, typically will carry the multiplexed service components of a number of basic services. As described hereinafter, a decoder 76 is provided at each subscriber location 72, 74 to enable the subscriber at that location to access different ones of the basic services in accordance with the present invention. In a subscription television system, the basic services are most often television programs or audio programs that are output on a television set 78 and/or audio output device 80 at the subscriber location.

For the purpose of providing virtual service selection at subscriber locations, each basic service transmitted to the subscribers is assigned a unique virtual service number. Assignment of virtual service numbers to each basic service is completely arbitrary and will usually be performed by the operator(s) of the communications system. For example, in a subscription television system, service number "14" could be assigned to a particular pay-television service, service number "6" could be assigned to a network broadcast, and so on. Subscribers are typically provided with a "program guide" that lists each available service by its assigned virtual service number. Alternatively, graphical user interfaces may be provided in which the user is able to select a basic service by the service's name, rather than by its assigned virtual service number. Essentially, the graphical user interface would "hide" from the subscriber the association between the displayed service name and its assigned virtual service number. As used herein and in parent application Ser. No. 07/027,782, the terms "service number", "basic service number", "virtual service number" and "virtual channel number" are equivalent.

In any virtual service selection scheme, virtual service definitions are used to associate the virtual service numbers assigned to each basic service to the transmitted service components that "make up" each basic service. As used herein and in parent application Ser. No. 08/027,782, the terms "virtual service definition" and "service-to-component map definition" are synonymous. Virtual service definitions, or service-to-component map definitions, are sometimes also referred to as "virtual channel definitions"

Figures 5, 7:
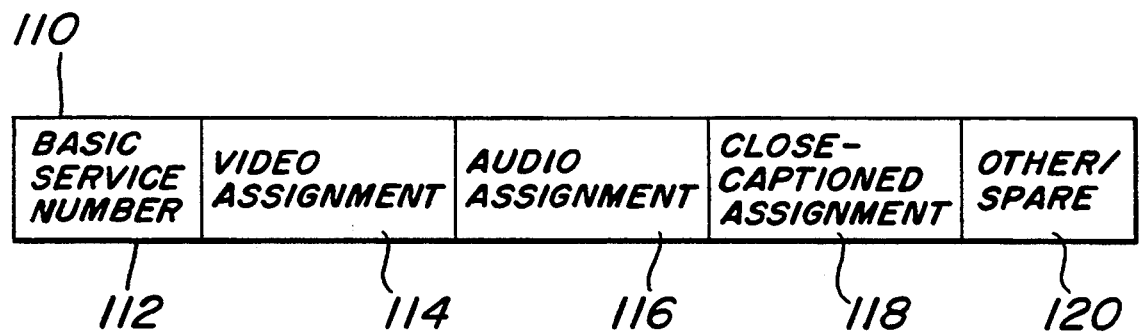
FIG. 5 illustrates the general arrangement and contents of an exemplary service-to-component map definition in accordance with one embodiment of the present invention.
FIG. 7 illustrates the general arrangement and contents of an exemplary tuning map in accordance with one embodiment of the present invention.

At least one virtual service definition (i.e., service-to-component map definition) is required for each basic service. FIG. 5 illustrates the general arrangement and contents of one embodiment of a virtual service definition 110 for a given basic service. In particular, the virtual service definition 110 shown in FIG. 5 may be employed to facilitate virtual service selection in a subscription television system employing the frame-based multiplexing format illustrated in FIGS. 2 and 3. As shown, the definition 110 comprises a virtual service number designation 112 that specifies the virtual service number assigned to the particular basic service being defined. The virtual service number designation 112 is followed by one or more service component assignments 114 . . . 120. Each of the service component assignments 114 . . . 120 identifies a different one of the service components that collectively comprise the basic service being defined. For example, in a subscription television system, a basic service is typically a television program which may consist of an audio service component, a video service component and possibly a closed-captioning service component. Accordingly, the virtual service definition for that basic service must identify which video, audio and closed-captioning service components make-up that particular basic service.

As explained above, in the prior art, the virtual service definitions for every subscriber selectable basic service are stored in a memory in the decoder, and are sometimes collectively referred to as a "virtual service map", "service-to-component map", "channel map", "virtual channel map" or "virtual service map" In the prior art, when a subscriber selects a given virtual service number for viewing, etc., the decoder must access the virtual service definitions in the stored "channel map" to determine which multiplexed service components received by the decoder are associated with the basic service assigned that virtual service number. Essentially, the decoder accesses the stored "channel map" and retrieves the virtual service definition whose virtual service number field (e.g. field 112 of the exemplary definition of FIG. 5) matches the virtual service number selected by the subscriber. Once tuned to the appropriate frequency channel, the decoder retrieves the service components (e.g., audio and video signals) specified in the virtual service definition from the incoming data on that frequency channel.

Unfortunately, with an ever increasing number of available services, the cost of memory required to store an entire "channel map" in the decoder can become prohibitive. According to the present invention, therefore, the virtual service definitions for every basic service are not stored in the subscriber's decoder. Rather, as explained hereinafter in greater detail, the virtual service definition for each basic service is periodically, and frequently, re-transmitted to the subscriber's decoder on the frequency channel carrying the service components of that basic service. All that is stored in the decoder is a tuning map that identifies which frequency channel carries the multiplexed service components of the selected service, however, even the tuning map may be periodically and frequently retransmitted to the decoder to avoid the need to store it in the decoder. A tunable receiver in the decoder tunes to the appropriate frequency channel specified in the tuning map as carrying the service components of the selected basic service. Once the receiver tunes to the specified frequency channel, which typically will carry the service components of several different basic services, the decoder must extract one of the virtual service definitions for the selected service from the incoming data stream. A demultiplexer in the decoder then uses the service component assignment information in the extracted virtual service definition to identify and retrieve the service components of the selected basic service from the incoming multiplexed data stream on the tuned frequency channel.

In a subscription television system such as that illustrated in FIGS. 1 and 4, the virtual service definitions for each basic service may be generated by the encoders 18 and inserted into the respective multiplexed data streams at each programmer site 12, 14, 16. According to the present invention, each encoder 18 generates the virtual service definitions for the basic services carried in the multiplexed data stream generated by that encoder 18. Alternatively, the virtual service definitions for each basic service can be inserted into their respective multiplexed data streams by the operator of the cable head-end installation 52 shown in FIG. 4.

When the exemplary frame-based multiplexing format of FIGS. 2 and 3 is employed, the virtual service definitions may be inserted into the system data region 32 of one or more frames 28 of a given multiplexed data stream 26. Preferably, the virtual service definitions for each basic service carried in a given multiplexed data stream are inserted into the data stream, and therefore transmitted, once every cryptocycle. Frequent re-transmission of each virtual service definition allows the decoder to quickly acquire the appropriate definition whenever the subscriber selects a new virtual service number (i.e., changes channels).

As explained above, in the exemplary subscription television system of FIGS. 1 and 4, each multiplexed data stream generated by a respective encoder 18 is modulated at the cable head-end 52 on a unique 6 MHz frequency channel. Thus, each frequency channel carries, in its respective multiplexed data stream, the multiplexed service components of one or more basic services. And, in accordance with the present invention, the virtual service definitions for each basic service are periodically (and frequently) retransmitted on the frequency channel carrying the service components of that basic service. In a preferred embodiment each frequency channel only carries the virtual service definitions for the services carried on that frequency channel, and therefore transmission bandwidth is conserved. Additionally, because the virtual service definitions are periodically and frequently retransmitted to the decoder, the decoder does not have to store an entire service-to-component map (i.e., channel map) in a memory in the decoder.

FIG. 6 is a block diagram of one embodiment of an apparatus 82 for providing virtual service selection in a multi-service communications system in accordance with the present invention. In particular, apparatus 82 of FIG. 6 may be employed as the decoder 76 at each subscriber location in a subscription television system (e.g. system 10 of FIGS. 1–4) when the system employs the frame-based multiplexed data stream format illustrated in FIGS. 2 and 3. According to the present embodiment, the apparatus 82 comprises a service selection switch 90 for selecting one of the available basic services, using its assigned virtual service number (i.e., virtual channel number), for output on a television set 78 and/or audio output device 80 at the subscriber location. The service selection switch 90 may comprise a push-button device wherein each button corresponds to a different virtual service number. Alternatively, the service selection switch 90 may comprise a hand-held remote-control wherein the selected service number appears on an LED display on the apparatus 82. Still further, the service selection switch 90 may comprise a graphical user interface displayed on a computer or television screen at the subscriber location.

Figure 8:
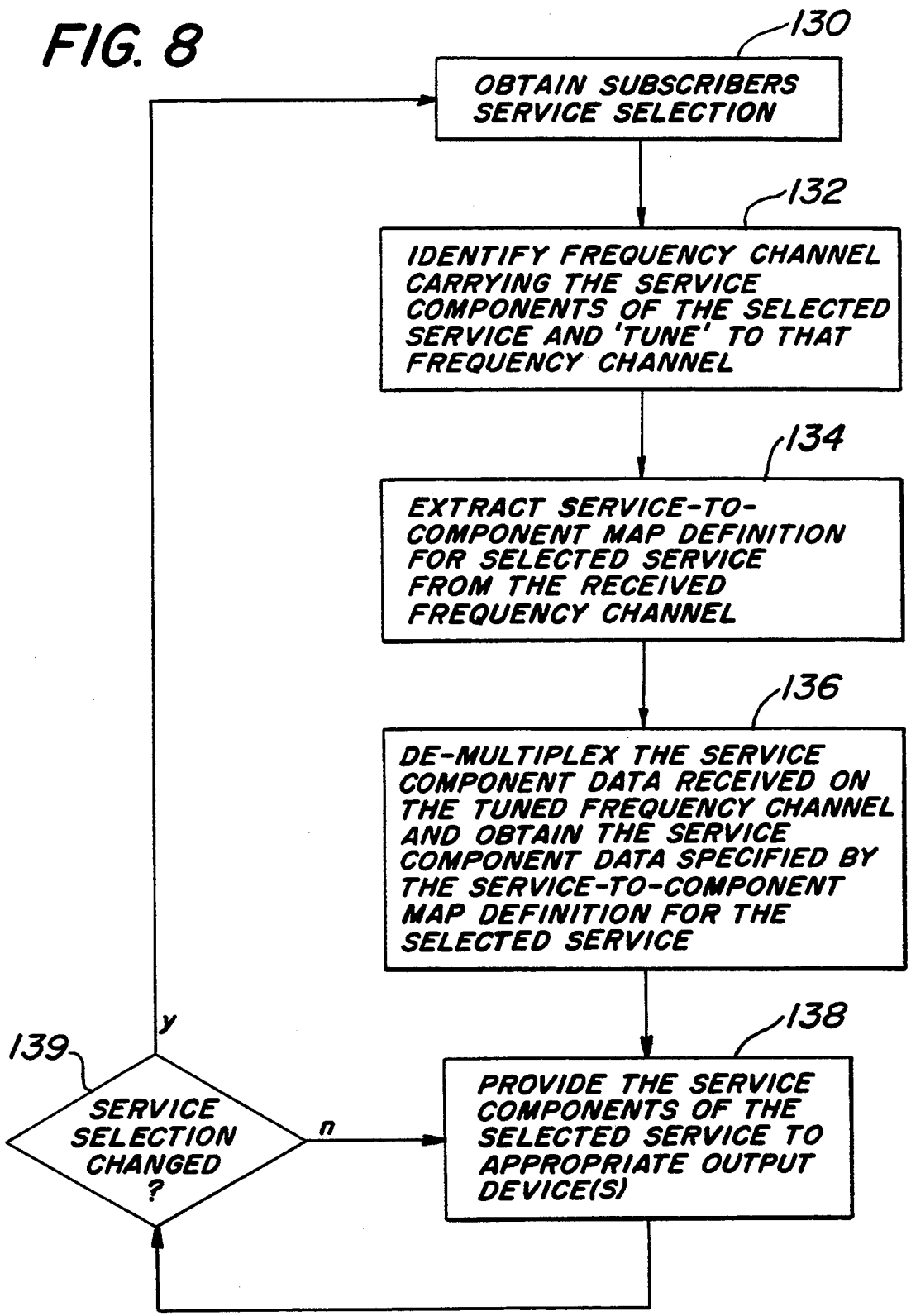
FIG. 8 is a flow diagram illustrating both the operation of the apparatus of FIG. 6 and one embodiment of the method of the present invention.

Apparatus 82 further comprises a tuning map 92 which specifies, for each basic service, which of the frequency channels carries the service components that "makeup" that basic service. According to the present embodiment, the tuning map 92 is stored in a memory in the apparatus 82. However, the tuning map 92 may be modified by transmitting modified tuning map entries to the apparatus 82. In the present embodiment, tuning map information may be transmitted as system data (see, e.g., FIG. 3) on one or more of the frequency channels when required. An exemplary tuning map 92 is illustrated in FIG. 8. As shown, the tuning map 92 comprises an entry for each basic service (identified by its virtual service no.) available to a subscriber. For each basic service, the tuning map 92 specifies the frequency channel (e.g., $f_1$, $f_2$, etc.) that carries the multiplexed service components for that basic service. For example, according to the tuning map 92 shown, the service components of basic service no. "24" are carried on frequency channel $f_2$, the service components of basic service no. "3" are carried on frequency channel $f_3$, and so on.

When a subscriber selects a given basic service, the virtual service number for that service is provided by the service selection switch to the tuning map 92 via line 93. The tuning map 92 then provides the appropriate frequency index, $f_x$, to a tunable receiver 98 which tunes to that frequency channel. Once tuned to the appropriate frequency channel, the receiver begins receiving the multiplexed service components and system data, which in the present embodiment are carried on that frequency channel in the frame-based multiplexed data stream format illustrated in FIGS. 2 and 3.

Apparatus 82 further comprises a system data processor 100 coupled to the receiver 98 for receiving the incoming multiplexed service components and system data. In the present embodiment, wherein the system data and multiplexed service components are transmitted in the frame-based data stream format illustrated in FIGS. 2 and 3, the processor 100 may employ the HSYNC and FSYNC words to establish frame synchronization to facilitate extraction of the system data from each frame. Also in the present embodiment, the system data processor 100 is coupled to the service selection switch 90 for receiving the virtual service number of the basic service currently selected by the subscriber. According to the present embodiment, the system data processor 100 employs the selected virtual service number to extract one of the virtual service definitions for the selected basic service from the incoming system data on the received frequency channel. To this end, the system data processor 100 may compare the subscriber selected virtual service number with each incoming virtual service definition until it finds a definition whose virtual service number designation matches the selected virtual service number. Once extracted, the virtual service definition is provided to a temporary virtual service definition store 94 (referred to in parent application Ser. No. 08/027,782 as "service-to-component map 94" and U.S. Pat. No. 5,359,601). The virtual service definitions for all other basic services carried on the received frequency channel are simply ignored.

As an alternative, the system data processor 100 may extract the virtual service definitions for each of the basic services carried on the received frequency channel (only) and then provide each of those definitions to storage memory 94. In such an embodiment, the virtual service number of the selected basic service may then be provided by the service selection switch 90 directly to memory 94 (via dashed-line 63, for example) as an index thereto in order to retrieve the definition for the selected service. While such an embodiment would require additional memory, the amount of memory required would still be significantly less than that required in prior art systems in which the virtual service definitions for every basic service on every frequency channel are stored in the decoder.

Referring still to FIG. 6, the system data processor 100 passes the multiplexed service components received on the tuned frequency channel to a service component demultiplexer 102. The service component demultiplexer 102 is responsive to the virtual service definition of the selected service, which has been stored in memory 94, for de-multiplexing the received multiplexed service components and obtaining therefrom the service components specified in the extracted virtual channel definition as comprising the selected basic service. Video related service components of the selected service (e.g., video, closed-captioning, teletext, etc.) may be output to a video processor 104 and then displayed on a television set 78. Audio service components of the selected basic service may be output to an audio processor 106 and then provided to an audio output device, such as a speaker system 80. Exemplary implementations of system data processor 100 and a service component demultiplexer 102 may be found in the aforementioned co-pending U.S. application Ser. No. 07/968,846.

Again, however, the particular implementations of the processor 100 and de-multiplexer 102 are not crucial to the present invention and will depend, in large part, upon the particular data stream format employed in the multi-service communications system.

In operation, a subscriber selects one of the basic services via the service selection switch 90, using its assigned virtual service number. Switch 90 provides the virtual service number of the selected basic service to the tuning map 92 which prompts the tunable receiver 98 to immediately tune to the frequency channel specified in the tuning map 92 for that service number. Switch 90 also provides the virtual service number of the selected basic service to the system data processor 100. Once the system data processor 100 begins receiving the incoming data from the tuned frequency channel, the processor uses the selected service number to extract one of the virtual service definitions for the selected service from the incoming data on the tuned frequency channel. The multiplexed service component data received on the tuned frequency channel is passed to the service component de-multiplexer 102. De-multiplexer 102 receives the extracted virtual service definition from the storage memory 94 and employs the information specified therein to de-multiplex the incoming service component data and to extract therefrom the service components of the selected basic service. Once the service components for the selected basic service have been obtained, video related services may be provided to a video processor 104, and audio related services may be provided to an audio processor 106. As explained above, the present invention is by no means limited to audio and video related service components. For example, a service component may be comprised of computer related data that may then be output on a computer system (not shown) at the subscriber location. As stated above, the present invention may be employed in any multi-service communications system.

FIG. 8 is a flow diagram illustrating both the operation of the apparatus of FIG. 6 and one embodiment of the method of the present invention. As shown, at step 130, a subscriber's service selection is obtained via the service selection switch 90. Next, at step 132, the frequency channel carrying the service components of the selected service is identified via the tuning map 92, and the apparatus then "tunes" to that frequency channel. Once tuned to the appropriate frequency channel, one of the virtual service definitions for the selected service is extracted from the received frequency channel at step 136. As explained above, when the frame-based multiplexing format illustrated in FIGS. 2 and 3 is employed, the virtual service definition for the selected service is extracted from the system data region of one or more incoming frames of the multiplexed data stream carried on the tuned frequency channel. The virtual service definition for the selected service specifies which service components carried on the tuned frequency channel "make-up" the selected service. For example, if the selected service is a television program, the virtual service definition for that service will typically identify a video service component and a related audio service component that together "make-up" that television program. Additionally, if the selected television program is closed-captioned for the hearing impaired, the virtual service definition may also specify a closed-caption service component that contains the appropriate closed-captioning data for that television program.

Once the virtual service definition for the selected program has been extracted from the incoming data on the tuned frequency channel, control passes to step 136 wherein the incoming multiplexed service components carried on the received frequency channel are de-multiplexed. Using the service component assignments specified in the virtual service definition for the selected service, the apparatus 82 (i.e., demultiplexer 102) is able to identify and retrieve the service components that comprise the selected service and to provide those service components to suitable output devices, as indicated at step 138. For example, the audio service component (i.e., the audio data or signal) of a selected basic service will be provided to a suitable audio output device, such as, for example, the audio output device 80 shown in FIG. 6. Similarly, the video service component of a selected basic service will be output to a suitable display device, such as, for example, the television set 78 of FIG. 6. Unless a subscriber selects a different service (i.e., "changes channels"), the apparatus will remain at step 138 and continue to output the service components of the currently selected service. However, as shown at step 140, if the subscriber selects a different service, then control passes back to step 130.

If the newly selected service is also carried on the currently tuned frequency channel, the apparatus 82 will not have to "tune" to a different frequency channel at step 132. Rather, the apparatus will merely have to extract one of the virtual service definitions for the newly selected service at step 134. As explained, according to the present invention, the virtual service definition for each basic service is frequently retransmitted on the tuned frequency channel thereby enabling the apparatus to quickly acquire one of the definitions for the newly selected service. If the tuning map 92 indicates that the newly selected service is carried on a different frequency channel than the one currently being received, however, the apparatus must "re-tune" to the new frequency channel before proceeding to step 134.

FIG. 9 graphically illustrates the mapping functions of the apparatus 82. For convenience of illustration only, the service selection numbers (i.e., "virtual service numbers") are illustrated twice in FIG. 9; once to illustrate the tuning map 92 functionality and once to illustrate the mapping of virtual service numbers to their respective service components via the respective virtual service definitions. As explained above, each basic service is assigned a unique virtual service number by an operator of the communications system. In the present example, there are thirty-two basic services (e.g., basic service nos. 1-32). In other embodiments, however, the number of basic services may be different. Moreover, according to the present invention, although the virtual service definitions for each service collectively define a "virtual service map" (i.e., "service-to-component map"), the entire virtual service map is never stored in the apparatus 82. Rather, the virtual service definition for each basic service is periodically, and frequently, re-transmitted to the apparatus 82 on the frequency channel carrying the service components of that basic service so that a decoder can extract the necessary definitions when needed. For convenience of illustration, FIG. 9 shows the virtual service definitions for every basic service.

As illustrated in FIG. 9, and as explained above, the tuning map 92 identifies, for each basic service, which of the frequency channels carries the multiplexed service components of that basic service. Once the appropriate frequency channel is identified, the virtual service definition of a selected basic service (transmitted on that frequency channel along with the multiplexed service component data) specifies which multiplexed service components within that frequency channel "make-up" the selected basic service.

The foregoing embodiment of the present invention is fully described in parent application Ser. No. 08/027,782, now U.S. Pat. No. 5,359,601. Element numerals in FIGS. 1–10 of the present application correspond directly to like element numerals in parent application Ser. No. 08/027,782, now U.S. Pat. No. 5,359,601. Parent application Ser. No. 08/027,782, now U.S. Pat. No. 5,359,601, however, is more particularly directed to an additional service selection feature referred to therein as "dynamic" virtual service selection. Although the foregoing description illustrates one embodiment of the present invention, i.e., in a subscription television system employing a frame-based multiplexing scheme (FIGS. 2 and 3), the present invention is by no means limited thereto. Rather, the present invention may be employed in any multiservice communications system.

Recently, the International Organization for Standardization (ISO) adopted a standard format for multiplexing a plurality of digital services for transmission in a multi-service communications system. The standard, is set forth in detail in the MPEG-2 Systems Committee Draft (ISO/IEC JTC1/SC29/WG11/N0601, November, 1993) [hereinafter "MPEG-2 Systems Committee Draft"], which is hereby incorporated by reference. One section of the MPEG-2 Systems standard specifies a format (i.e., a syntax and a set of semantic rules) for multiplexing a number of digital signals to generate a multiplexed data stream, referred to therein as a "Transport Stream." Essentially, the MPEG-2 Transport Stream specification describes a packetized, as opposed to frame-based, multiplexing scheme. Although not limited to application in any one type of multi-service communications system, the MPEG-2 Systems standard is particularly well suited for transmission of digital video, audio and related data. Accordingly, as an alternative to the frame-based multiplexed data stream format illustrated in FIGS. 2 and 3, the MPEG-2 Systems standard may be implemented in the exemplary subscription television system 10 of FIGS. 1 and 4. In particular, the encoder 18 at each programmer site 12, 14, 16 may operate in accordance with the MPEG-2 Systems standard to multiplex the service components of the basic services input to that encoder for transmission to subscribers. Thus, rather than generate a multiplexed data stream having the frame-based format illustrated in FIGS. 2 and 3, each encoder 18 will generate a "Transport Stream" in accordance with the MPEG-2 Systems standard.

As used herein and in the MPEG-2 Systems Committee Draft, the terms "service component" and "elementary stream" are equivalent, as are the terms "basic service" and "program". According to the MPEG-2 Systems standard, the service components (i.e., elementary streams) that comprise a basic service (i.e., program) to be transmitted are each separately "packetized" to form a distinct "packetized elementary stream" (PES). For example, the video service component data for a given basic service would be packetized (i.e., consecutive portions of the service component data would be inserted into consecutive PES packets) to form one packetized elementary stream, and the audio service component data for that basic service would be packetized to form another packetized elementary stream. Each packetized elementary stream is assigned a unique Packet ID (PID). Each packetized elementary stream is then partitioned and inserted into the payload sections of a number of successive "transport packets". Every transport packet has a header, and each transport packet formed from a given packetized elementary stream contains the unique PID assigned to that elementary stream in its header. The individual transport packets formed from each elementary stream are then multiplexed in accordance with the MPEG-2 Systems standard to form a single bitstream, referred to therein as a "Transport Stream", comprised of a continuous sequence of transport packets.

Applicant and his Assignee are actively involved in the ISO standards process and proposed the present invention, as defined by the appended claims, for inclusion into the MPEG-2 Systems standard as a means for providing virtual service selection in multi-service communications systems that operate in accordance with the MPEG-2 Systems standard. Applicants' invention, as defined by the appended claims, has been adopted as part of the MPEG-2 Systems standard. For example, the MPEG Systems standard provides for a "Network Information Table" that is equivalent to the tuning map described above in that it specifies, for each basic service (program), which frequency channel (Transport Stream) carries the service components (elementary streams) that comprise that basic service. Additionally, according to the standard, a "program definition" for each basic service is periodically, and frequently, retransmitted to subscriber decoder's on the frequency channel (i.e., Transport Stream) carrying the service components of that basic service. A "program definition" associates a subscriber selectable "program number" with the service components that "make-up" the basic service (i.e., "program") assigned that program number. As in the claimed invention, once a decoder tunes to the frequency specified in the "Network Information Table", it must then extract the "program definition" for the basic service selected by the subscriber in order to determine which service components carried in the Transport Stream received on that frequency channel "make-up" the selected basic service.

As described in greater detail in the MPEG-2 Systems Committee Draft, the "program definition" for a subscriber selected basic service (i.e., "program") specifies the Packet ID's of each packetized elementary stream containing service component data associated with that selected program. Once the PID's have been identified, the decoder can simply extract every incoming packet having a PID that matches those specified in the program definition. In this manner, the service component data in each packetized elementary stream can be retrieved for output at the subscriber location. As used herein and in the MPEG-2 Systems Committee Draft, the terms "virtual service definition" and "program definition" describe equivalent elements, as do the terms "virtual service map" and "Program Map Table" and the terms "tuning map" and "Network Information Table". Accordingly, the appended claims are intended to read on any multi-service communications system that implements a virtual service selection feature in accordance with the MPEG-2 Systems standard (ISO 13818) set forth in the aforementioned MPEG-2 Systems Committee Draft.

Moreover, it is understood that changes may be made to the embodiments described above without departing from the broad inventive concepts thereof. Accordingly, this invention is not limited to the particular embodiments disclosed, but is intended to cover all modifications that are within the scope and spirit of the invention as defined by the appended claims.

What is claimed is:

1. A method for providing virtual service selection at a subscriber location in a multi-service communications system wherein a plurality of basic services are transmitted to the subscriber location and each of said basic services comprises one or more service components, the service components for each of said basic services being transmitted to the subscriber location on one of a plurality of different frequency channels, said method comprising the steps of:

generating a virtual service definition for each of said basic services that specifies which of the service components carried on a particular frequency channel comprise that basic service; and periodically transmitting the virtual service definition for each of said basic services to the subscriber location on the frequency channel carrying the service components that comprise that basic service;

whereby a decoder at the subscriber location tunes to the frequency channel carrying the service components of a selected basic service, extracts from the tuned frequency channel one of the virtual service definitions transmitted thereon for the selected basic service, and then obtains, from the tuned frequency channel, the service components specified in the extracted virtual service definition.

2. A method according to claim 1 further comprising the step of assigning a unique virtual service number to each of said basic services, and wherein the virtual service definition for each basic service comprises a virtual service number designation and at least one service component assignment.

3. A method according to claim 1 wherein said multi-service communications system operates in accordance with the MPEG-2 Systems standard (ISO 13818), each of said basic services defining a program in accordance with said standard, and each virtual service definition defining a program definition in accordance with said standard.

4. In a multi-service communications system wherein a plurality of basic services are transmitted to a subscriber location, and wherein each of said basic services comprises a plurality of service components, the service components of each of said basic services being received at the subscriber location in multiplexed form on one of a plurality of frequency channels, some frequency channels containing multiplexed service components for more than one of said basic services, and further wherein virtual service definitions are periodically transmitted to the subscriber location for each of said basic services on the frequency channel carrying the service components of that basic service, the virtual service definitions for each of said basic services specifying which service components carried on the frequency channel comprise that basic service, a method of accessing the service components of a subscriber selected basic service comprising the steps of:

tuning to the frequency channel carrying the service components of the selected basic service;

extracting from the tuned frequency channel one of the virtual service definitions transmitted thereon for the selected basic service; and obtaining from the tuned frequency channel the service components specified in the extracted virtual channel definition as comprising the selected basic service.

5. A method according to claim 4 wherein each of said basic services is assigned a unique virtual service number, and wherein the virtual service definition for each of said basic services comprises a virtual service number designation and at least one service component assignment.

6. A method according to claim 4 wherein a tuning map is provided at the subscriber location that specifies, for each of said basic services, which of the frequency channels carries the multiplexed service components that comprise that basic service, and wherein said tuning step comprises the steps of:

accessing the tuning map to determine which of the frequency channels carries the multiplexed service components of said selected basic service; and tuning to the frequency channel specified in the tuning map for the selected basic service.

7. A method according to claim 4 wherein said multi-service communications system operates in accordance with the MPEG-2 Systems standard (ISO 13818), each of said basic services defining a program in accordance with said standard, and each virtual service definition defining a program definition in accordance with said standard.

8. Apparatus for providing virtual service selection at a subscriber location in a multi-service communications system wherein a plurality of basic services are transmitted to the subscriber location and each of said basic services comprises one or more service components, the service components of each of said basic services being transmitted to the subscriber location in multiplexed form on one of a plurality of different frequency channels wherein some of said frequency channels carry the service components of more than one of said basic services, said apparatus comprising:

means for generating a virtual service definition for each of said basic services that specifies which service components carried on a particular frequency channel comprise that basic service; and means for periodically transmitting to the subscriber location the virtual service definition for each of said basic services, the virtual service definition for a given basic service being transmitted to the subscriber location on the frequency channel carrying the service components that comprise that basic service.

9. Apparatus as recited in claim 8 further comprising a decoder for use at the subscriber location, said decoder comprising:

a service selection switch for selecting one of said basic services for output at the subscriber location;

means for tuning to the frequency channel carrying the multiplexed service components of a selected basic service and for receiving the multiplexed service components carried on that frequency channel;

means for extracting from the tuned frequency channel one of the virtual service definitions transmitted thereon for the selected basic service; and a de-multiplexer coupled to said receiving means and responsive to the extracted virtual service definition for de-multiplexing the received multiplexed service components and for obtaining the service components specified in the extracted virtual service definition as comprising the selected basic service.

10. Apparatus recited in claim 9 wherein said means for tuning and receiving comprises:
   a tuning map that specifies, for each of said basic services, which of said frequency channels carries the multiplexed service components that comprise that basic service; and
   a tunable receiver responsive to said tuning map for tuning to a frequency channel specified by said tuning map.

11. Apparatus recited in claim 9 wherein said extracting means is coupled between said receiving means and said demultiplexer.

12. A method according to claim 8 wherein said multi-service communications system operates in accordance with the MPEG-2 Systems standard (ISO 13818), each of said basic services defining a program in accordance with said standard, and each virtual service definition defining a program definition in accordance with said standard.

13. A decoder apparatus for providing virtual service selection at a subscriber location in a multiservice communications system wherein a plurality of basic services are transmitted to the subscriber location and each of said basic services comprises a plurality of service components, the service components of each of said basic services being received at the subscriber location in multiplexed form on one of a plurality of frequency channels, some frequency channels containing multiplexed service components for more than one of said basic services, and further wherein a virtual service definition for each of said basic services is periodically transmitted to the subscriber location on the frequency channel carrying the service components of that basic service, the virtual service definition for a given basic service specifying which service components carried on a particular frequency channel comprise that basic service, said decoder apparatus comprising:
   a service selection switch for selecting one of said basic services for output at the subscriber location;
   means for tuning to the frequency channel carrying the multiplexed service components of a selected basic service and for receiving the multiplexed service components carried on that frequency channel;
   means for extracting from the tuned frequency channel one of the virtual service definitions transmitted thereon for the selected basic service; and
   a de-multiplexer coupled to said receiving means and responsive to the extracted virtual service definition for de-multiplexing the received multiplexed service components and for obtaining the service components specified in the extracted virtual service definition as comprising the selected basic service.

14. Apparatus recited in claim 13 wherein said means for tuning and receiving comprises:
   a tuning map that specifies, for each of said basic services, which of said frequency channels carries the multiplexed service components that comprise that basic service; and
   a tunable receiver responsive to said tuning map for tuning to a frequency channel specified by said tuning map.

15. Apparatus recited in claim 13 wherein said extracting means is coupled between said receiving means and said demultiplexer.

16. A method according to claim 13 wherein said multi-service communications system operates in accordance with the MPEG-2 Systems standard (ISO 13818), each of said basic services defining a program in accordance with said standard, and each virtual service definition defining a program definition in accordance with said standard.

* * * * *